United States Patent
Gurrieri et al.

(10) Patent No.: US 7,844,419 B1
(45) Date of Patent: Nov. 30, 2010

(54) METHOD OF DETECTING POTENTIAL TOPOLOGY PROBLEMS IN A NETWORK

(75) Inventors: Robert A. Gurrieri, Thomaston, CT (US); Robert F. Mankowski, Watertown, CT (US)

(73) Assignee: Bentley Systems, Incorporated, Exton, PA (US)

( * ) Notice: Subject to any disclaimer, the term of this patent is extended or adjusted under 35 U.S.C. 154(b) by 973 days.

(21) Appl. No.: 10/440,724

(22) Filed: May 19, 2003

Related U.S. Application Data

(60) Provisional application No. 60/439,285, filed on Jan. 10, 2003.

(51) Int. Cl.
*G06F 17/50* (2006.01)
(52) U.S. Cl. .................................. 703/1; 703/6; 703/9
(58) Field of Classification Search ...................... 703/1, 703/9; 715/852, 866
See application file for complete search history.

(56) References Cited

U.S. PATENT DOCUMENTS 5,586,254 A * 12/1996 Kondo et al. ................... 714/25
6,247,019 B1    6/2001 Davies

OTHER PUBLICATIONS

MWH Soft, "MWH Soft News", Jul. 2002, Issue 5, pp. 1-10.*
MWH Soft, "News", retrieved from http://www.mwhsoft.com/page/p_news/news_mod.htm on Oct. 12, 2006.*
Lewis A. Rossman, "EPANET 2 Users Manual", Sep. 2000, U.S. Environmental Protection Agency, pp. i-200.*
Bentley Systems Incorporated, "MicroStation GeoGraphics(r) Workflows Guide", 1999, Bentley Systems Incorporated, pp. 1-1 through 1-22.*
Walid G. Aref and Hanan Samet, "Duplicate Elimination using Proximity in Spatial Databases", May 1993, University of Maryland, pp. 1-30.*
Autodesk, Inc.; "AutoCAD Map 2000 User's Guide"; Mar. 22, 1999; Autodesk, Inc.; 616 pages.*
Deborah Hix, et al.; "Developing User Interfaces, Ensuring Usability Through Product & Process"; 1993; John Wiley & Sons, Inc.; pp. 57-93.*
Richard Johnsonbaugh, "Discrete Mathematics", 2001, Prentice-Hall Inc., Fifth Edition, pp. 55-58.*
Yen, Ben Chie, Chapter 6: Hydraulics of Sewer Systems, pp. 6.1-6,113, from Stormwater Collection Systems Design Handbook edited by Larry W. Mays.
Boulos, Paul F. et al., Explicit Calculation of Pipe-Network Parameters, submitted for review and possible publication on Mar. 5, 1990, Journal of Hydraulic Engineering, vol. 116, No. 11, Nov. 1990, pp. 1329-1344.

(Continued)

*Primary Examiner*—Jason Proctor
(74) *Attorney, Agent, or Firm*—Cesari and McKenna, LLP

(57) ABSTRACT

The present invention is a method for detecting potential topology problems in a network representation consisting of links and nodes. In accordance with one embodiment of the invention, there are three potential topology problem cases that are identified by the program. Those include nodes in close proximity, pipe-split candidates in which nodes are close to pipes, and pipe-split candidates in which pipes overlap. The program searches the data for any cases that fall within user-defined criterion or tolerances and returns a list of potential problems that the user can visually inspect and, if necessary or desired, make corrections thereto. Graphic user interfaces with dialog boxes and action buttons are also provided in accordance with the invention.

18 Claims, 4 Drawing Sheets

OTHER PUBLICATIONS

Wu, Zheng et al. Optimal Capacity Design of Water Distribution Systems, presented to the 1st ASCE Annual Environmental and Water Resources System Analysis (EWRSA) Symposium, May 19-22, 2002, Roanoke, VA, USA, pp. 1-9.

* cited by examiner

METHOD OF DETECTING POTENTIAL TOPOLOGY PROBLEMS IN A NETWORK

CROSS-REFERENCE TO RELATED APPLICATIONS

The present application claims the benefit of U.S. Provisional Patent Application Ser. No. 60/439,285, which was filed on, Jan. 10, 2003, by Gurreiri, et al. for a METHOD OF DETECTING POTENTIAL TOPOLOGY PROBLEMS IN A NETWORK, and is hereby incorporated by reference.

BACKGROUND OF THE INVENTION

1. Field of the Invention

This invention relates to software programs that produce topological representations of networks from geometric representations.

2. Background Information

In many civil engineering applications and in other engineering fields, software programs are employed to model and graphically represent a network including a set of links and nodes. Such resultant representations may be topological representations generated from geometric representations stored in a global information system (GIS), or a computer aided design system (CAD). These geometric systems provide a spatial description of a network which can be used to construct a topological representation of a network (such as a water distribution system that is a lattice of pipes and junctions, which are the links and nodes in that particular application). Software programs that generate topological representations use the spatial proximity data inherent to the underlying geometric representation to construct a topological representation of the network (which can then be used to model system behavior).

There can, however, be inaccuracies in the resulting network representation due to some inherent difficulties in topology, particularly in areas where there is a close proximity between two (or more) data structures. Such data structures are sometimes referred to as "nearest neighbors". The user of the geometric representation software program, for example, can graphically draw nodes or links in close proximity, incorrectly. Geometrically, for example, a T intersection may visually appear to exist in the representation of a water distribution network; however, if not drawn correctly the pipes at the T-intersection would not be topologically connected at a junction. Inaccuracies in the geometric representation are generally not overly problematic, because the visual representation appears correct. But when these geometric inaccuracies are propagated to the topological representation, hard to detect problems arise because the model will not accurately reflect the behavior of the "real" system.

As noted, software programs are available that generate network models and other representations. Some of these programs include features for identifying some aspects of topological inaccuracies. However, they can be based on iterative sequential searching, which can be quite slow. In addition, such programs may require the user to view hundreds of essentially redundant potential candidates, which can be laborious and time consuming, and which can lead to human errors. In the case of the "pipe split candidate node" search, for example, it would not be feasible to perform a generic spatial query for nodes in close proximity to pipes, because every node in the system is in close proximity to a pipe. There remains a need, therefore, for a method of detecting nearest neighbor topology problems, which quickly locates potential candidates and provides a manageably short list to a user for review. There remains a further need for such a software program that provides the user an opportunity to navigate to the potentially problematic location in the network representation and to take corrective action that can be implemented quickly.

SUMMARY OF THE INVENTION

The disadvantages of prior techniques are addressed by the present invention which provides a method of detecting potential topology problems in a network consisting of connected links (edges) and nodes (vertices), which may include spatial relationships. The present invention detects potential topology problems by locating nodes and links that are in such close proximity to another node or link that a potential topology problem might exist. These nearest neighbor candidates are flagged for the user as potential problems. In accordance with one embodiment of the invention, there are three potential topology problem cases that are identified by the program. Those include nodes in close proximity, pipe-split candidates (in which nodes are close to pipes), and pipe-split candidates (in which two pipes intersect or overlap). In the water distribution network example, the software of the present invention locates candidates, referred to herein to as pipe split candidates, in which a link (which represents a pipe in the water distribution context), is a candidate to be split by a node which is positioned along a single pipe, but visually appears to be the shared endpoint of two pipes. Further, the present invention locates pipe-split candidates in which pipes that visually appear to overlap should, in fact, be connected at a junction. These potential problems are flagged and can be visually checked by the user.

More specifically, the present invention searches the data structures that are stored in conjunction with a topological network representation system and identifies those nearest neighbor candidates that are in such close proximity that they could be problematic. The invention includes the further feature that the tolerance criterion for the search can be user-defined. This flexibility allows the user to refine the search, depending upon the particular application. The search is then conducted and the results produced are the data structures that fall within the user-defined criterion. A list is generated of structures that are to be checked by a user who is familiar with the actual system that the model represents. Of course, in order to be useful, the list includes substantially all items that are potentially problematic. However, the list should not be so inclusive that the user's review of the search results is unduly burdensome.

Next, the items on the search result list can be selected by the user and a "Go To" feature is engaged to navigate to that portion of the network diagram containing the potential problem. The user then visually checks the area, and makes corrections, if necessary or desired, and then proceeds to the next item identified on the list. The user checks whether the candidates returned in the search result list are correct representations of the actual underlying data structures, and the user can then take corrective action. This tool is useful for finding and correcting connectivity problems. For example, if two nodes are close to each other, they may actually be the same node and yet have been represented as two different nodes in the original GIS\CAD system. In such a case, the user can delete one of the nodes after the visual check of the network representation on screen. In the case of "nodes in close proximity", a "nearest neighbor" search (using a user specified tolerance) is performed on a "search set" (which initially contains every node in the system). During the process (to improve performance, and to keep the list of problem elements to a minimum) nodes that are determined to be in close proximity to the current search node are removed from the "search set" (e.g. if it is determined that node1 is close to node2, for the purpose of this invention it would be redundant to also indicate that node2 is close to node1).

With respect to nodes that may be in close proximity to a pipe, this invention performs a similar spatial query, but returns nodes that are in close proximity to a pipe, and are not topologically connected to that pipe. A novel aspect of this invention is that nodes that are in close proximity to a pipe endpoint (and are not topologically connected to that pipe) are not returned in this query, because these nodes fall into the "nodes in close proximity" category.

Defaults may also be included that are tailored to a particular type of system, such as a water distribution network, if desired. In the illustrative embodiment of the invention, the search results are returned to the user in list form referring to pipes and nodes in a water distribution network. It should be understood, however, that other types of networks, and different modes of returning search results, can be employed while remaining within the scope of the present invention.

BRIEF DESCRIPTION OF THE DRAWINGS

The invention description below refers to the accompanying drawings, of which.

DETAILED DESCRIPTION OF AN ILLUSTRATIVE EMBODIMENT

The method of the present invention is embodied in a software program, which operates in conjunction with a software model of a civil engineering system. The model uses data stored in an associated database that virtually describe the physical structures of the real world system. A computer-generated, global information system (GIS) produces a representation of the system, using information from a geometric representation, as a topological network of data structures. In a water distribution system, for example, the water distribution network consists of a plurality of pipes, which are connected at junctions. The pipes may be of different diameters and different lengths. In addition, the pipes could be at different underground elevations.

Figure 1:
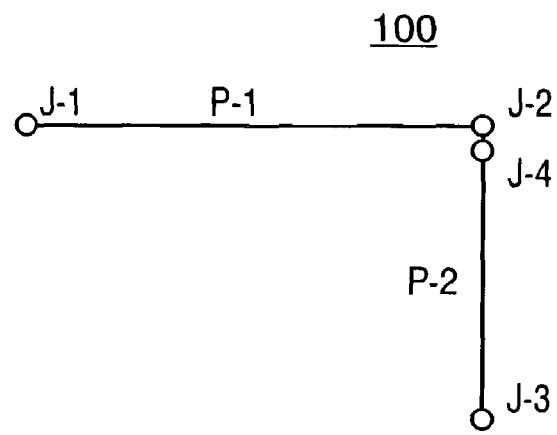
FIG. 1 is a schematic illustration of a network portion in which the results returned include nodes in close proximity.
Figure 2:
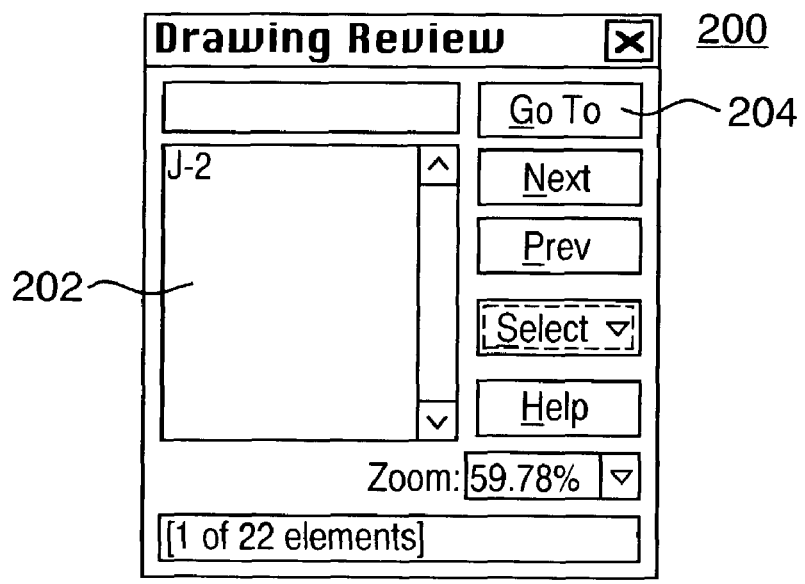
FIG. 2 is a graphical user interface "GUI", which can be employed using the method of the present invention.

The present invention can be more readily understood with reference to the drawings beginning with FIGS. 1 and 2. FIG. 1 illustrates the "nodes in close proximity query." It is assumed that the user has predefined a search criterion to search for all nodes within a certain proximity to one another. Generally, the software system represents a scale model of the actual system. Thus, distance represented would reflect substantially the real distance between structures as they actually exist in the ground. Generally, the user would specify a tolerance range of 3 feet to 5 feet, for example. The tolerance can vary and would depend on the nature of the system and the core that the CAD/GIS draftsman used when drawing the geometric representation.

An example of one of the search results that is returned by the program is illustrated as network portion 100. Network portion 100 is comprised of a pipe (P-1), which should be connected to another pipe (P-2). Pipe P-1 has, at one end, a junction, J-1. Pipe P-2 has, at one end, a junction, J-3. The pipes appear to be connected at junction J-2. However, another junction, J-4, in close proximity to J-2 also appears in the diagram. J-2 is in such close proximity to junction J-4, that a question is raised about whether this is actually a correct junction (node). The results of the query are shown in dialog box 202 of graphic user interface 200 of FIG. 2. In this embodiment of the invention, one of the elements in the area of the potential topology problem (J-2) is identified. This allows the user to quickly navigate to this area in the network representation of FIG. 1, using the "Go To" button 204. It is possible that J-4 could have been returned instead of J-2, which would be equally acceptable. Using the graphic user interface 200 of FIG. 2, the user can highlight the potential topology problem by highlighting the J-2 indication and click the "Go To" button 204, in which case the program will navigate to J-2 and show the nearest neighbor area so that the user can visually inspect the area and identify any problems. If necessary, the user can make a correction. This can include deleting the junction J-4 should it appear that it is a false junction that was incorrectly included. A delete function can be performed using an associated network editor that includes a "delete node" feature. In addition to the delete, the user would detach Pipe P-2 from the incorrect junction J-4, and attach it to the correct junction J-2. A system for performing this type of operation was described in commonly-owned U.S. patent application Ser. No. 10/145,841 filed on May 14, 2002 for a METHOD AND SYSTEM FOR THE STORAGE AND USE OF ENGINEERING MODELING ALTERNATIVES WITH UNITIZED DATA, which is incorporated by reference herein.

Figure 3A:
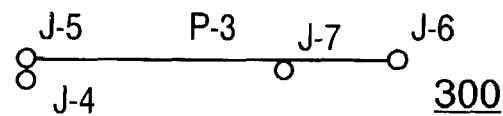
FIGS. 3A and 3B are schematic illustrations of network portions illustrating pipe-split candidate results.

In accordance with another aspect of the invention, the software program allows a user to find nodes that are closer to a pipe than a user-defined tolerance, but are not connected to that pipe. This query is sometimes referred to herein as a "pipe-split candidate—nodes." A tolerance is defined in a "pipe-split candidate—nodes" dialog box (not shown), which opens when a pipe-split candidate option is selected from a menu offered as part of the user interface of the software program of the present invention. As shown in FIG. 3A, a first network portion 300 illustrates the pipe P-3 that has at one end junction J-5 and at an opposite end, junction J-6. Two other junctions, J-4 and J-7 appear in close proximity to other structures in the diagram. This suggests that there is a potential topology inaccuracy. The dialog box illustrated in FIG. 4 lists junction J-7 as one of the query results. The user will navigate to J-7 by highlighting the J-7 in the query results return dialog box and clicking the "Go To" button 404. When the program navigates to that portion of the network and displays it to the user, the user can then determine whether to delete J-7, to move it onto the pipe as a junction along that pipe, or to further investigate. It is also noted that junctions J-4 and J-5 are also close and this would be detected by the nodes in close proximity task, which was illustrated with respect to FIG. 1.

Figure 3B:
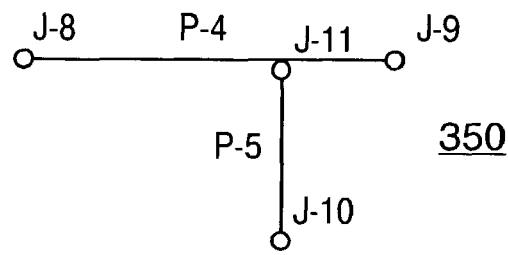
Figure 4:
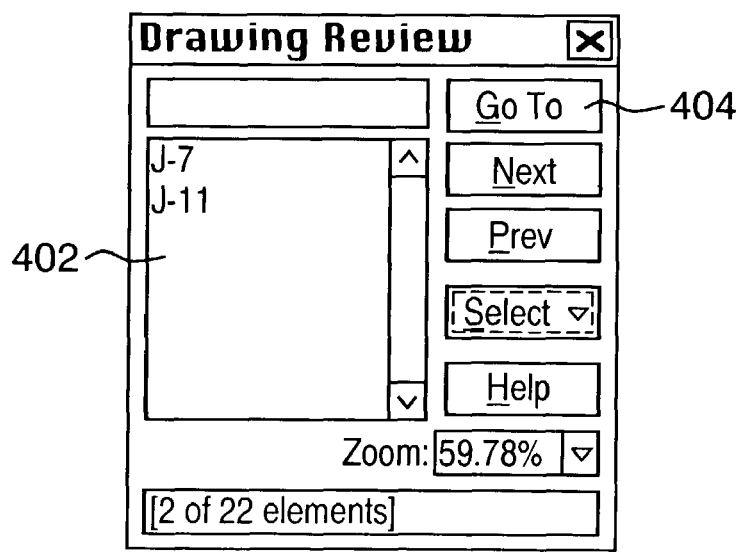
FIG. 4 is a schematic illustration of a GUI in which the dialog lists results for review in the case illustrated in FIGS. 3A and 3B.
Figure 5:
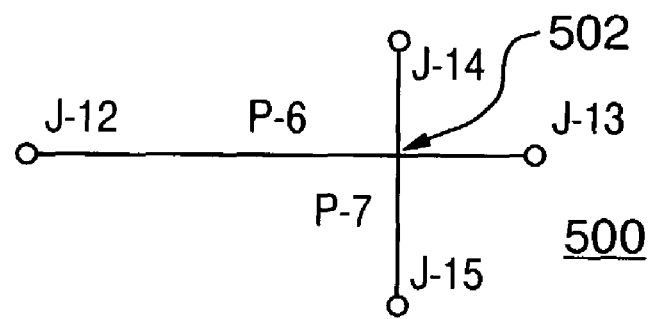
FIG. 5 is a schematic illustration of a network portion generated for results of a pipe-split candidate in which two pipes appear to overlap.

Similarly, with reference to FIG. 3B, the network portion 350 has pipes P-4 and P-5 that may be connected at junction J-11, however junction J-11 appears close to P-4, but not intersecting it in the diagram. Thus, junction J-11 has been returned as a query result in the dialog box of FIG. 4. The user can highlight J-11, click "Go To" button 404 and navigate to network portion 350. The user will then determine whether P-4 is actually connected to P-5 at junction J-11. The next several examples illustrate another aspect of the invention, which involves a "pipe-split candidates—links query." That is the case in which two links appear to overlap, and could potentially be connected. As shown in FIG. 5, the network portion 500 includes the pipes P-6 and P-7. P-6 intersects with P-7. It would thus be possible that there should be a junction at the point of intersection. In the dialog box 602, shown in the graphic user interface 600 of FIG. 6, the point of intersection "P-6>>P-7" is returned so that the user can navigate to the point of the topology problem by highlighting that reference and clicking the "Go To" button, 604. It is noted that if one of the pipes was returned alone, the user might not see the intersection or the problem regarding the intersection. When the user does navigate to the point of intersection 502 of FIG. 500, the user can then add a node by an "add node" function in the associated network editor program, described above.

Figure 7:
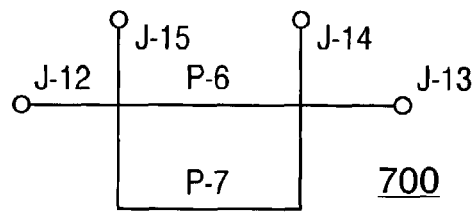
FIG. 7 is a schematic illustration of a network portion illustrating pipe overlap in several locations.

In accordance with a further aspect of the invention, the network portion 700, depicted in FIG. 7, illustrates the example in which pipes P-6 and P-7 appear to intersect in more than one location. For example, pipe P-7 can have a "u" shape and pipe P-6 is a straight line thus there are two points of intersection at which, perhaps, there should be junctions. In this case, the dialog box 800 of FIG. 8 will return both P-6 and P-7 intersections in two separate entries. Each point of intersection can be highlighted and the user can navigate to that portion of the program. The user can then decide whether or not a junction should exist at either or both of those points of intersection. It is possible that several modifications may need to be made here—a user with knowledge of the actual system can make this decision. The software of the present invention returns an inclusive, but manageable list for review.

Figure 6:
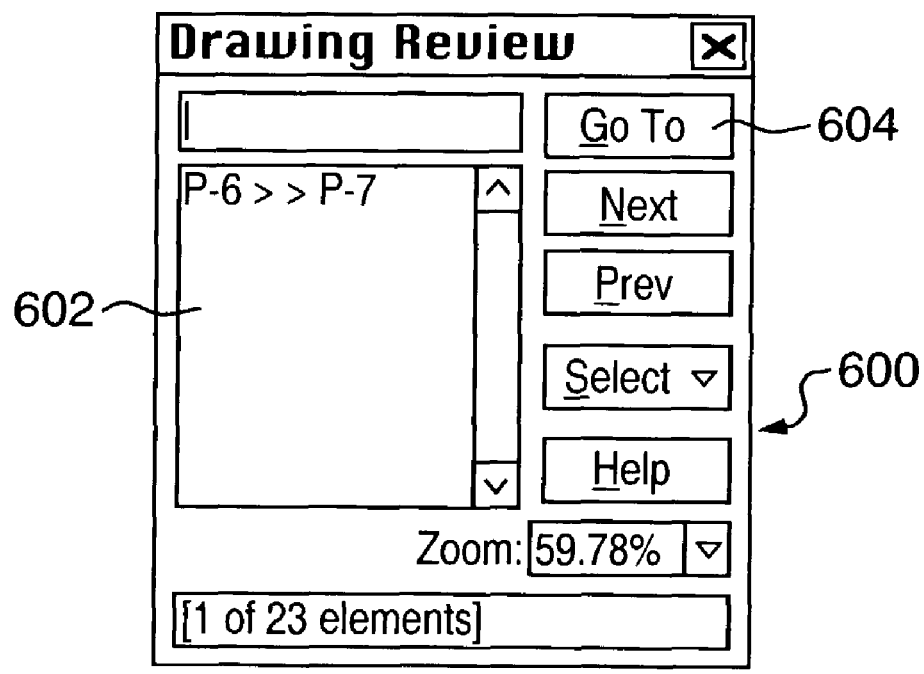
FIG. 6 is a schematic illustration of a GUI in which the dialog lists results for review in the case illustrated in FIG. 5.
Figure 8:
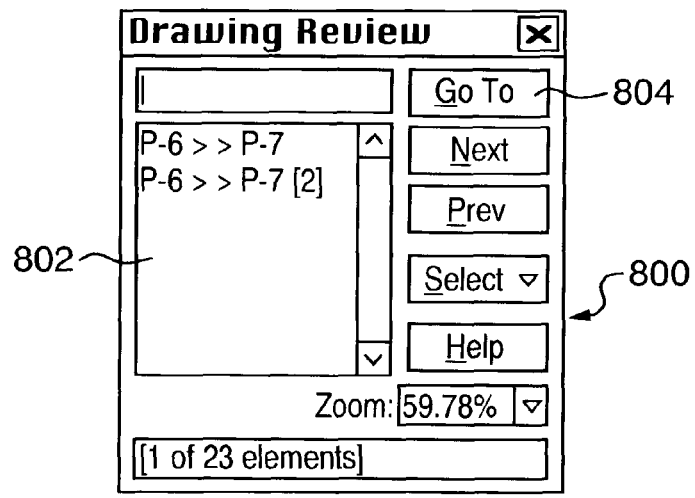
FIG. 8 is a schematic illustration of a GUI in which the dialog lists results for review in the case illustrated in FIG. 7.
Figure 9:
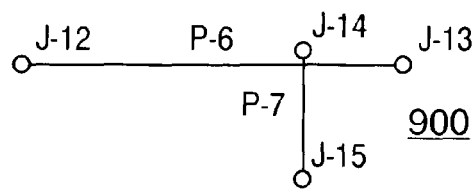
FIG. 9 is a schematic illustration of a network portion in which a junction is closer to a pipe and may be returned in the pipe-split candidate query.

As shown in FIG. 9, if J-14, for example, on P-7 is close to P-6, this would probably fall within the "pipe split candidates—nodes" category described with reference to FIGS. 3 and 4, and would be included in those results as opposed to the results of FIGS. 6 and 8, but the programmer can determine how such results are to be displayed in the particular application.

It should be understood that the present invention allows the user to search for potential topology problems in a network representation. The user can define the search tolerance criteria for performing searches of a complex network model and for navigating to the area of potential topology problems that fall within the user-defined tolerances. Once the user visually inspects the potential topology problem, the user can then take corrective steps as necessary or desirable in the particular application. This solves the problem of prior techniques, which required the user to sequentially look through hundreds of data representations to individually, visually inspect the entire network for potential problems.

The foregoing description has been directed to specific embodiments of the invention. It will be apparent however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A method for detecting potential topology problems in a representation of a network that includes a plurality of elements, comprising:
   receiving tolerance criteria that specify a proximity between certain types of elements, the tolerance criteria selected to identify potential topology problems;
   searching for potential topology problems by establishing a search set that initially contains all the plurality of elements,
   automatically removing differing elements from the search set based on the elements being within a certain proximity from other elements, and
   searching only the elements of the search set with the elements removed for elements of the search set with the elements removed whose proximity to any other elements of all the plurality of elements satisfies the tolerance criteria, the searching of only the search set with the elements removed to substantially prevent redundant identification of potential topology problems;
   based on the searching for potential topology problems, generating a list of potential topology problems, wherein a potential topology problem is an identified potential topological inaccuracy in the representation of the network that would cause the representation of the network to not accurately reflect behavior of a corresponding real system;
   displaying the list of potential topology problems in a user interface of a computing device;
   permitting selection by a user of a particular potential topology problem from the list; and
   providing a button in the user interface, that when engaged by the user, automatically navigates to an area of the representation of the network associated with the selected particular potential topology problem to permit visual inspection of the area.

2. The method as defined in 1 wherein the elements include one or more links and one or more nodes.

3. The method as defined in claim 2 wherein the tolerance criteria includes a predetermined distance between nodes, and the step of searching for potential topology problems further comprises:
   searching the representation of the network for nodes within the predetermined distance of one another.

4. The method as defined in claim 3 wherein the step of generating further comprises:
   including only one of two or more nodes within the predetermined distance of one another in the list of potential topology problems.

5. The method as defined in claim 2 wherein the tolerance criteria includes a predetermined distance between a node and a link, and the step of searching for potential topology problems further comprises:
   searching the representation of the network for nodes within the predetermined distance of links, but that are not connected to the links.

6. The method as defined in claim 2 wherein the tolerance criteria includes an overlap of two or more links, and the step of searching for potential topology problems further comprises:
   searching the representation of the network for links that overlap, but that are not connected to each other.

7. The method as defined in claim 2 wherein the representation of the network is a representation of a water distribution network, the nodes include junctions, and the links include pipes.

8. The method as defined in claim 1 wherein the user interface is a graphical user interface, and selection of the particular potential topology problem includes highlighting the particular potential topology problem in a dialog box of the user interface.

9. A computer readable medium for detecting potential topology problems in a representation of a network that includes a plurality of elements, the computer readable medium comprising program instructions for:
    receiving tolerance criteria that specify a proximity between certain types of elements, the tolerance criteria selected to identify potential topology problems, wherein a potential topology problem is a potential topological inaccuracy in the representation of the network;
    establishing a search set that initially contains all the plurality of elements;
    automatically removing differing elements from the search set based on the elements being within a certain proximity from other elements;
    searching only the elements of the search set already having elements removed for elements of the search set already having elements removed whose proximity to any other elements of all the plurality of elements satisfies the tolerance criteria;
    based on the searching, generating a list of potential topology problems; and
    displaying the list of potential topology problems in a user interface.

10. A computer readable medium for detecting potential topology problems in a representation of a network that includes a plurality of elements, the computer readable medium comprising program instructions for:
    receiving tolerance criteria that specify a proximity between certain types of elements, the tolerance criteria selected to identify potential topology problems by establishing a search set that initially contains all the plurality of elements,
    automatically removing elements from the search set based on the elements being within a certain proximity from other elements, and
    searching only the elements of the search set with the elements removed for elements of the search set with the elements removed whose proximity to other elements of all the plurality of elements satisfies the tolerance criteria, to substantially prevent redundant identification of potential topology problems;
    searching for potential topology problems;
    based on the searching for potential topology problems, generating a list of potential topology problems, wherein a potential topology problem is a potential topological inaccuracy in the representation of the network that would cause the representation of the network to not accurately reflect behavior of a corresponding real system;
    displaying the list of potential topology problems in a user interface;
    permitting selection by a user of a particular potential topology problem from the list; and
    providing a button in the user interface, that when engaged by the user, automatically navigates to an area of the representation of the network associated with the selected particular potential topology problem to permit visual inspection of the area.

11. The computer readable medium as defined in 10 wherein the elements include one or more links and one or more nodes.

12. The computer readable medium as defined in 11 wherein the tolerance criteria includes a predetermined distance between nodes, and the program instructions for searching for potential topology problems further comprise program instructions for:
    searching the representation of the network for nodes within the predetermined distance of one another.

13. The computer readable medium as defined in 12 wherein the program instructions for generating further comprise program instructions for:
    including only one of two or more nodes within the predetermined distance of one another in the list of potential topology problems.

14. The computer readable medium as defined in 11 wherein the tolerance criteria includes a predetermined distance between a node and a link, and the program instructions for searching for potential topology problems further comprise program instructions for:
    searching the representation of the network for nodes within the predetermined distance of links, but that are not connected to the links.

15. The computer readable medium as defined in 11 wherein the tolerance criteria includes an overlap of two or more links, and the program instructions for searching for potential topology problems further comprise program instructions for:
    searching the representation of the network for links that overlap, but that are not connected to each other.

16. The computer readable medium as defined in 11 wherein the representation of the network is a representation of a water distribution network, the nodes include junctions, and the links include pipes.

17. The computer readable medium as defined in 10 wherein the user interface is a graphical user interface, and selection of the particular potential topology problem includes highlighting the particular potential topology problem in a dialog box of the user interface.

18. A method for detecting potential topology problems in a representation of a network that includes a plurality of elements, comprising:
    receiving tolerance criteria that specify a proximity between certain types of elements, the tolerance criteria selected to identify potential topology problems, wherein a potential topology problem is a potential topological inaccuracy in the representation of the network;
    establishing a search set that initially contains all the plurality of elements;
    automatically removing differing elements from the search set based on the elements being within a certain proximity from other elements;
    searching only the elements of the search set already having elements removed for elements of the search set already having elements removed whose proximity to any other elements of all the plurality of elements satisfies the tolerance criteria;
    based on the searching, generating a list of potential topology problems;
    displaying the list of potential topology problems in a user interface of a computing device;
    permitting selection by a user of a particular potential topology problem from the list; and
    providing a tool in the user interface, that when engaged by the user, automatically navigates to an area of the representation of the network associated with the particular potential topology problem to permit visual inspection of the area.

* * * * *